United States Patent [19]
Beck

[11] 4,092,526
[45] May 30, 1978

[54] SECURE PROPERTY DEVICE

[75] Inventor: Charles K. Beck, Mentor, Ohio

[73] Assignee: Addressograph-Multigraph Corp., Cleveland, Ohio

[21] Appl. No.: 690,586

[22] Filed: May 27, 1976

[51] Int. Cl.² .................. G06K 19/08; B42D 15/00
[52] U.S. Cl. .................. 235/487; 427/207 A; 235/493; 235/419; 283/7
[58] Field of Search ........... 427/207 R, 207 A, 207 B, 427/207 C, 207 D; 156/313, 314, 315; 40/2 R; 235/61.12 R, 61.12 M, 61.12 N, 61.7 B, 61.11 E, 61.11 D; 360/2; 250/568, 569; 283/7; 340/146.3 P

[56] References Cited
U.S. PATENT DOCUMENTS

| | | | |
|---|---|---|---|
| 3,245,697 | 4/1966 | Nugent | 283/7 |
| 3,455,577 | 7/1969 | Kikumoto | 235/61.12 R |
| 3,501,415 | 1/1976 | Taft | 427/207 A |
| 3,552,853 | 1/1971 | Sanders | 340/146.3 P |
| 3,586,593 | 6/1971 | Dahl | 235/61.12 M |
| 3,644,716 | 2/1972 | Nagata | 235/61.12 M |
| 3,812,328 | 5/1974 | Tramposca | 235/61.12 N |
| 3,838,252 | 9/1974 | Hynes | 235/61.7 B |
| 3,922,464 | 11/1975 | Silver | 427/207 B |
| 4,013,894 | 3/1977 | Foote | 235/61.12 M |

Primary Examiner—Robert M. Kilgore
Attorney, Agent, or Firm—Michael A. Kondzella

[57] ABSTRACT

A secure property device utilizing radiant energy reflectors applied to a magnetic data member is provided in which the specularity of reflections from the reflectors is enhanced by means of a polymeric primer which is chemically and optically compatible with the reflectors and with the magnetic data member to which it is applied.

38 Claims, 5 Drawing Figures

4,092,526

SECURE PROPERTY DEVICE

BACKGROUND OF THE INVENTION

The present invention is generally related to credit cards and, more particularly, to a secure property device for credit cards and the like to render such fraud resistant.

In the past, various credit card structures and schemes have been proposed for preventing or avoiding fraud involving credit card transactions or the like. The types of fraud most often encountered may be categorized into two groups:

(1) Credit card alteration, duplication and counterfeiting; and
(2) Unauthorized use of a valid credit card, as in the case of a lost or stolen card.

The problems presented by unauthorized use have been alleviated to some extent through the use of personal identification procedures and insurance programs which limit the liability of the card owner.

On the other hand, it has proven more difficult to cope with credit card alteration and counterfeiting. The problem will probably become more serious as advancing technology makes counterfeiting and card alterations easier to implement and more difficult to detect. Cards are used more and more each day for transactions such as retail purchases, auto rentals, travel expenses, cash dispensing and, of special importance, electronic funds transfer. Many of these transactions involve large sums of money which presents an even greater inducement to counterfeit credit cards with intent to defraud. It is apparent that the use of credit cards and like documents will continue to grow in the business world, provided an adequate solution is provided to the problem of counterfeiting.

In recent years, credit card structures have been proposed with invisible codes or the like, which are used to distinguish counterfeits from authentic cards. For example, U.S. Pat. No. 3,468,046 issued to Makishima et al. discloses a card structure bearing normally invisible indicia which may be read under ultraviolet light. The indicia include the card holder's signature which may be compared by the merchant with the customer's signed receipt or existing account records. This provides some degree of assurance that the person presenting the card is the true owner. However, it would not be difficult for a forger to duplicate the signature or to produce counterfeit cards by selecting appropriate filter material and fluorescent signature panels.

The use of infrared reflection and transmission for secrecy purposes has also been proposed. U.S. Pat. No. 3,829,662, issued to A. Furahashi, discloses a computer information card structure containing infrared reflective areas defined by adjacent IR absorbent ink, or alternately infrared transmissive holes. The ink and holes are concealed against visible detection by light top and bottom laminates of opaque material. This patent does not address itself specifically to the question of credit card security but rather computer card secrecy. If, in fact, the teachings were applied to credit cards, such would not provide a high degree of security as counterfeiting would merely involve dismantling of the card laminates to reveal the ink or holes which define the data.

U.S. Pat. No. Re. 28,081 in the name of J. E. Travioli discloses a credit card structure including a pattern of infrared radiation transmitting holes. The hole pattern is read and resultant signals which identify the card are used to check the account's credit status through a central processor. The patent is not directed to the use of the infrared radiation pattern to determine the authenticity of the card. Furthermore, the card structure is such that a counterfeiter could easily reproduce the hole pattern by disassembling the card.

SUMMARY OF THE INVENTION

The secure property device of the present invention provides a solution to the problem of credit card counterfeiting. The device comprises a magnetic recording member, preferably in the form of a magnetic stripe, which overlies an optical data track comprising a plurality of radiant energy reflecting elements. The secure property device can be conveniently affixed to a suitable substrate such as a plastic card in order to form a secure property document such as a credit card. The magnetic member is essentially opaque to visible radiation, yet transparent to infrared radiation. In one form of the invention, the radiant energy reflecting elements are defined by a vapor deposited metal which reflects infrared radiation through the magnetic member. Thus, the presence of a reflector is detected by the reflection of infrared radiation through the magnetic member.

The opaque quality of the magnetic member prevents detection of the reflective elements with visible radiation. The device may be further provided with a concealing layer of material, such as an ink, containing a large percentage of opaque pigments, such as carbon, which underlies the reflective elements and is opaque to various wavelengths of radiation including the visible range. Pigments opaque to X-rays or other radiation may be incorporated in said concealing layer. Since the reflective elements are concealed on both sides, the duplication of their exact size and spatial interrelationship is essentially impossible. In the preferred embodiment, reflective elements are produced by metallic vacuum deposition. The elements are extremely thin and are permanently bonded between the magnetic media and main body of the card. This makes it extremely difficult to determine the sizes and locations of the elements by grinding away the core stock or dismantling the card without destroying or distorting their spatial relationships.

It is a primary object of the present invention to provide a novel secure property device which is essentially impossible to duplicate or counterfeit.

It is still another object of the present invention to provide a unique method of manufacturing a secure property device including magnetic and optical data.

It is a further object of the present invention to provide a secure property device in which are embedded randomly placed radiant energy reflecting elements whose edges may be very accurately located with an infrared emitting and detecting device, in combination with a magnetic recording medium in vertical juxtaposition whereby the spatial interrelationships of the edges of said reflecting elements and the magnetic flux changes in said magnetic recording medium may be accurately determined.

Another object of the present invention is to provide a secure property device comprising a magnetic stripe which is by its nature essentially opaque to visible light, in combination with an optical data set defined by radiant energy reflecting elements such that the intensity and character of reflected radiant energy defines a signal pattern unique to the device and extremely difficult to duplicate or counterfeit.

DETAILED DESCRIPTION OF THE PREFERRED EMBODIMENT

Figure 1:
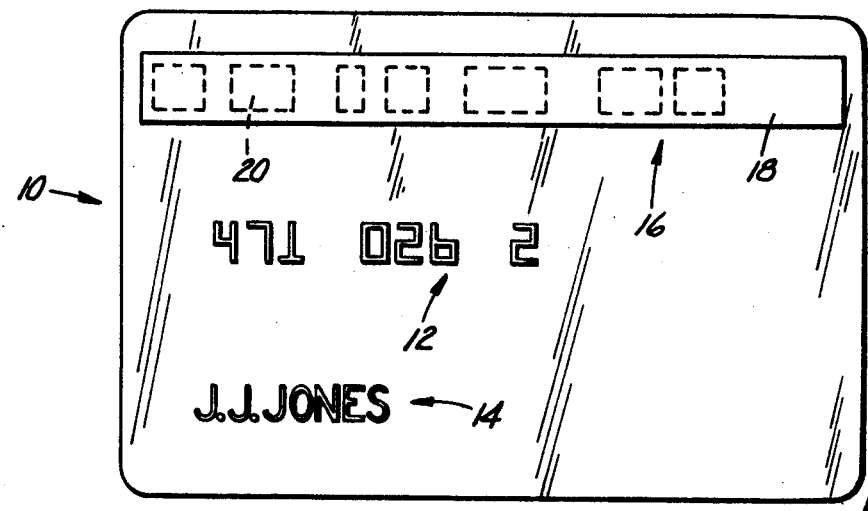
FIG. 1 is a top plan view of a typical credit card including the secure property device of the present invention.
Figure 2:
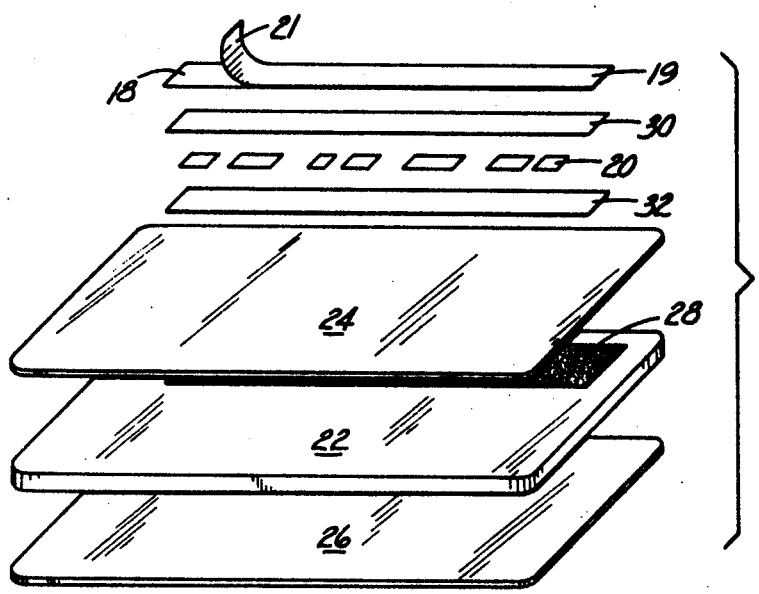
FIG. 2 is an exploded perspective view of the credit card illustrated in FIG. 1.

Referring now, more particularly, to FIGS. 1 and 2 of the drawing, a credit card incorporating the secure property device of the present invention is generally indicated by the numeral 10 and may include embossed data defining the account number and card holder's name as indicated at 12 and 14, respectively. The embossed data may be read by conventional embossed character readers and in a typical operation would be utilized to imprint sales receipt forms or the like.

The card is further provided with optical and magnetic data sets which usually reside in an area near the top edge of the card, this area being generally indicated by the numeral 16. In the preferred embodiment, the card is similar, if not identical in appearance to a conventional magnetically striped credit card, with magnetic data residing within a generally rectangular area 18. The magnetic stripe may include a plurality of magnetic data tracks for recording such information as account number, account balance, frequency of usage data, and date cycle information.

The secure property device is defined at least in part by an optical data set lying within the data area 16 and comprised of a plurality of radiant energy reflecting elements 20 which underlie the magnetic stripe 18. In the preferred embodiment, the radiant energy reflecting elements are comprised of vapor deposited reflectors, such as of aluminum, which reflect incident radiant energy including that in the infrared range. The location of the edges of the reflectors and the location of the magnetic flux changes are sensed by appropriate detectors, hereinafter described.

Referring now, more particularly, to FIG. 2, it will be appreciated that the main body of the card may be comprised of three polyvinyl chloride (PVC) and/or polyvinyl chloride acetate, layers 22, 24 and 26 laminated together. Center layer 22, commonly referred to as the core stock, preferably contains pigments and certain additives and has a matte finish and may be provided with colored areas and readable indicia. It is foreseeable that laminant layers 24 and 26 may be eliminated from the main body structure, if desirable. The top and bottom laminants 24 and 26 are smooth, thin, clear sheets, which are adhered to the core stock by conventional techniques.

During manufacture, prior to lamination, the top or bottom surface of the core stock 22 is provided with a shielding layer or coating of material 28 which is generally opaque to the transmission of radiant energy. In the preferred embodiment, ink containing a high percentage of carbon black is silk screened or printed onto the core stock in general alignment with data area 16 to provide the desired shielding characteristics. The carbon black absorbs a large percentage of incident radiation, thereby making it essentially impossible to detect the sizes and relative positions of the reflective elements by the transmission of infrared radiation through the document. This shielding layer is generally opaque to radiation through a wide frequency range which includes infrared, visible light, ultraviolet and X-rays. Materials other than carbon may be added to enhance opacity to particular wavelengths. For example, barium sulphate or lead containing pigments will increase opacity to X-rays.

Preferably, reflective elements 20 are provided by vapor depositing aluminum or some other metallic materials, onto the recording surface of the magnetic tape prior to a hot stamping process. Alternately, the vapor deposition may be made onto the core stock, if optically smooth or polished, or onto the associated laminant. The vapor deposition process involves the evaporation of aluminum under a vacuum. The aluminum vapor condenses onto the magnetic tape or other substrate. By using an appropriate mask during the aluminum evaporation the reflecting areas can be accurately defined, and the location of their edges can be accurately delineated using reflected infrared radiation. It has been found that vapor deposited aluminum of a thickness greater than 100 Angstroms provides reflection of essentially all of the incident infrared radiation. In the thickness range below 100 Angstroms the reflectivity of the deposited aluminum is a function of the thickness. While this is not a linear function, the thickness, or density, of aluminum deposited may be intentionally varied to provide optical signals which also vary in amplitude. It should be noted that the reflectors may be defined by materials other than vapor deposited aluminum. Other metals and alloys may be applied by vapor deposition, by plating or other techniques, to provide suitable reflection. It has also been found that non-metals such as stannous oxide may be vapor deposited and provide detectable reflection when illuminated with infrared radiation.

The microtopography of the magnetic recording surfaces of most commercially available magnetic tapes is such that the surfaces are optically "rough" in the sense that they diffusely reflect a portion of the incident radiation, rather than providing essentially specular reflection. If the reflective elements are vapor deposited directly onto the magnetic media surface, they also will be optically rough. This will result in diffuse reflection, making it difficult to detect the exact location of the edges of the reflective elements with a degree of accuracy acceptable for security purposes. This optical roughness may be corrected by various techniques prior to the step of vapor deposition. It has been found that the magnetic media may be made optically smooth by applying an appropriate organic coating 30 to the magnetic media side of the tape and allowing the coating to dry to a glossy layer. A coating suitable for this purpose must be compatible with the reflectors, magnetic media and overlying adhesive. This coating, hereinafter referred to as the primer, must be a material which is chemically and optically compatible with the reflectors and chemically compatible with any adhesive used to adhere the secure property device to a suitable substrate. By chemically compatible is meant not only that the primer itself should not react with the magnetic media, the reflectors or the adhesive, but also that any solvent from which the primer is applied should not react with or dissolve the magnetic stripe, reflectors, or adhesive. By magnetically compatible is meant that the primer and any solvent used for application thereof should not adversely affect the magnetic susceptibility or other magnetic properties of the magnetic media. By optically compatible is meant that the primer and any solvent used for application thereof should be generally optically smooth and substantially transparent to the radiant energy impinging upon the reflectors and should not adversely affect the ability of the reflectors to reflect a sufficient proportion of such radiant energy to enable easy detection of the presence of the reflectors and their position as hereinafter described.

In the manufacture of credit cards carrying a magnetic stripe, specially formulated magnetic tape containing a release layer between the magnetic coating and the polyester substrate is hot stamped onto the credit card body and the polyester stripped off and discarded. When metallic reflectors are deposited directly onto the recording surface of the magnetic tape there is usually inadequate adhesion between the reflectors and magnetic coating and the reflectors may adhere to the card satisfactorily but the overlying magnetic coating may be stripped off with the polyester, thus destroying the utility of the credit card so produced. Even if such a card can be manufactured satisfactorily the weak adhesive bonds between the aluminum reflectors and the magnetic coating may give rise to delamination and thus fail in service. Thus besides providing a specular substrate for the deposition of the reflectors, a second and equally important requirement of the primer is that it provides adequate adhesion between the reflectors and the magnetic coating.

It has been found that although various polymeric materials will satisfy some of the above stated requirements certain specially formulated acrylic resins in the form of solutions in organic solvents or, in the form of, aqueous emulsions are preferred. Formulations containing copolymers of lower alkyl acrylates and lower alkyl methacrylates, for example methyl methacrylate, butyl acrylate and butyl methacrylate are especially effective in obtaining the necessary adhesion as indicated heretofore. They also present a substantially planar surface to radiant energy such as infrared radiation whereby reflections from the reflectors coated upon said formulations have a very high degree of specularity with little diffuse component. The continuous phase utilized in providing solutions or emulsions of such copolymers must necessarily display the compatibilities referred to above. Aqueous emulsions are satisfactory for this purpose. Various aromatic hydrocarbon solvents such as toluene may be successfully used to dissolve the acrylic copolymer without causing any adverse effects with respect to the magnetic media, reflectors, adhesive or substrate.

There are several advantages to using the acrylic resins described above as the primer. In the first place, acrylics are generally more stable than other vinyl polymers. Halogenated vinyl polymers, for example, may have a tendency to dehydrochlorinate under the conditions used in the fabrication of the secure property devices of this invention. In another respect, acrylics are less likely to dissolve in solvents to which the primer layer may be exposed during processing. In addition, the critical surface tension of the acrylic primers described above is sufficiently high that it is possible to coat over the dried primer film such as with an adhesive if desired.

Since, as pointed out above, one of the functions of the primer is to adhere the reflectors to the magnetic coating it is necessary that the primer display the desired adhesive properties under the conditions of fabrication of the secure property device of this invention, that is, at elevated temperatures. At room temperature, on the other hand, the secure property device in the form of a tape must be non-tacky so that long lengths of tape can be handled and wound upon spools without sticking to itself.

A test designed to evaluate the adhesive properties of the primer of this invention makes use of a commercially available adhesive tape. The test is known as the "Cross-hatch Scotch Tape Test" and is conducted by making a series of cuts on the magnetic stripe overlying the reflectors so that a one inch section of the stripe contains 0.125 inch square cuts which penetrate through the magnetic material. Scotch tape #600 or equivalent is then pressed firmly on the cut portion of the stripe. The tape is then peeled off at an angle of approximately 45° and at a rate of 3 inches per second or less. If the tape can be thus peeled off without removing any of the magnetic stripe or primer or reflectors the primer is considered to pass the test and to be a satisfactory material for use in fabricating the secure property device of this invention.

In the preferred embodiment the reflective material is vapor deposited directly onto the above-described organic coating. Since high temperatures may cause wrinkling or other deformation of the tape, it is held in contact with a metal plate during vapor deposition, the metal plate acting as a heat sink. For high volume production, other means of temperature control may be employed.

Preferably, the magnetic stripe media 18 is formed by use of a conventional "hot stamp" reciprocating or rotary press. Briefly, this process involves the adherence of a magnetic tape 19 over the top laminant through the application of heat and pressure, and the subsequent stripping away of the polyester, indicated by the numeral 21 in FIG. 2.

In order to bind the magnetic media and associated reflective elements to the core stock and top laminant, an appropriate adhesive, indicated by the numeral 32, is applied to the tape and/or top laminant associated with the core stock prior to hot stamping. Materials similar to those used as the primer can be used as the adhesive. The same compatibilities govern as in the case of the primer. However, since the adhesive is not positioned in the optical path between the source of radiant energy and the reflectors it is also possible to use a dispersion of a methyl methacrylate polymer, for example a dispersion of a methyl methacrylate copolymer in a suitable organic medium such as diethyl ether. The organic medium must, of course, be chosen with regard to the chemical compatibilities discussed above.

It has been found that a magnetic medium comprised of gamma ferric oxide ($\gamma$-$Fe_2O_3$) properly dispersed in a suitable organic binder is substantially transparent to infrared radiation and permits satisfactory detection of the underlying reflectors. It will be appreciated that the $\gamma$-$Fe_2O_3$ is substantially opaque to normal visible radiation and thereby conceals the underlying reflectors against detection by the naked eye. For best results, the tape coating should not contain carbon black as such will absorb the incident infrared radiation and thereby attenuate the reflected radiation. However, a small percentage of carbon black may be tolerable as long as such does not significantly diffuse or absorb the incident or reflected infrared radiation.

Figure 3:
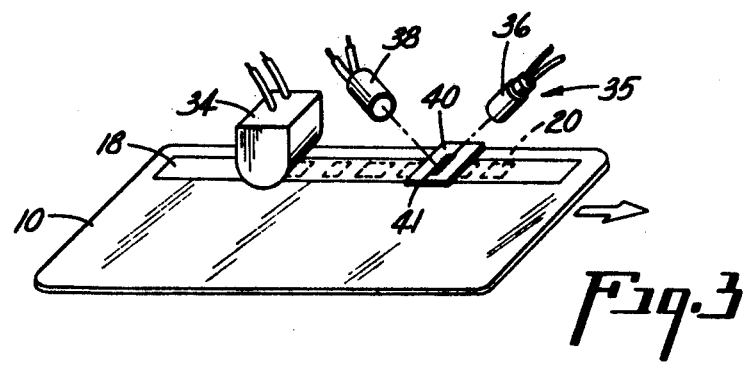
FIG. 3 is a simplified perspective view of a credit card incorporating the secure property device of the present invention in conjunction with an optical/magnetic reader.

FIG. 3 is a simplified diagrammatic illustration of a typical reader assembly which may be utilized with the secure property device of the present invention. The assembly includes a conventional magnetic read head 34 mounted in a predetermined spacial relationship to an optical detector generally indicated by numeral 35, including a source of infrared radiation 36 and a detector 38. Preferably, a shield member 40 is provided which overlies a portion of the card and is provided with a narrow slit 41 which allows a narrow beam of infrared radiation to penetrate the magnetic media and reach the underlying reflective elements. As the card or document is transported by appropriate means, not illustrated, magnetic data are provided by read head 34 and optical data representative of the reflective elements 20 are provided by sensor 38. There are various commercially available infrared sensors and sources which may be utilized. One such suitable sensor is of the lead sulfide type available from Infrared Industries, Inc. as the 1000 Series. This detector is highly sensitive to radiation of 1–3 microns in wavelength.

Figure 5:
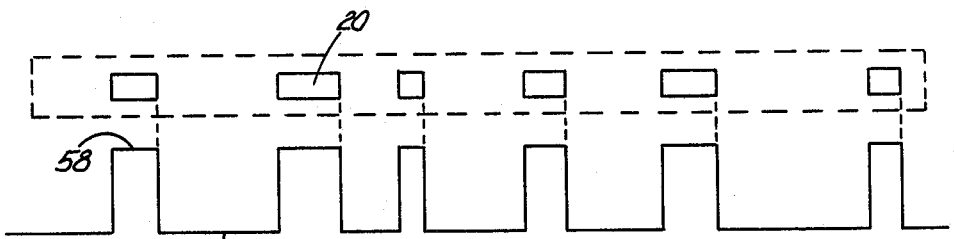
FIG. 5 is a diagram illustrating the optical data signals provided by the reader illustrated in FIG. 3.

Referring now to FIG. 5, the nature of the optical data generated by the reflective elements may be more fully understood. As the document passes beneath the optical detector 35, the intensity of sensed infrared radiation varies considerably between background areas and reflective areas. The signal generated by sensor 38 in the absence of a reflective element is indicated by the numeral 56 and is negligible in strength since a large percentage of the incident infrared radiation is absorbed by the carbon black contained in the underlying shielding layer 28. When a reflective element 20 passes beneath the detector, the resultant signal is increased significantly to a higher level as indicated by the numeral 58. At the trailing edge of the reflective element, the signal drops back to the background level and remains there until the leading edge of the next reflective element is detected.

When all of the reflective elements have been detected, the resultant optical signal pattern is utilized to determine the authenticity of the card. The number, sizes, and positions of the reflective elements may be varied during the manufacturing process. If desired, the reflective elements may be produced randomly or within controlled limits such that the resultant signal pattern is substantially unique to the particular card. The security system may be designed to detect the leading and/or trailing edges of the reflectors. It also is anticipated that the security system could be designed to analyze the area of the reflective elements or to measure the amplitude of the resulting signal or possibly ignore the signals generated by some elements, thereby further enhancing the degree of overall system security.

Figure 4:
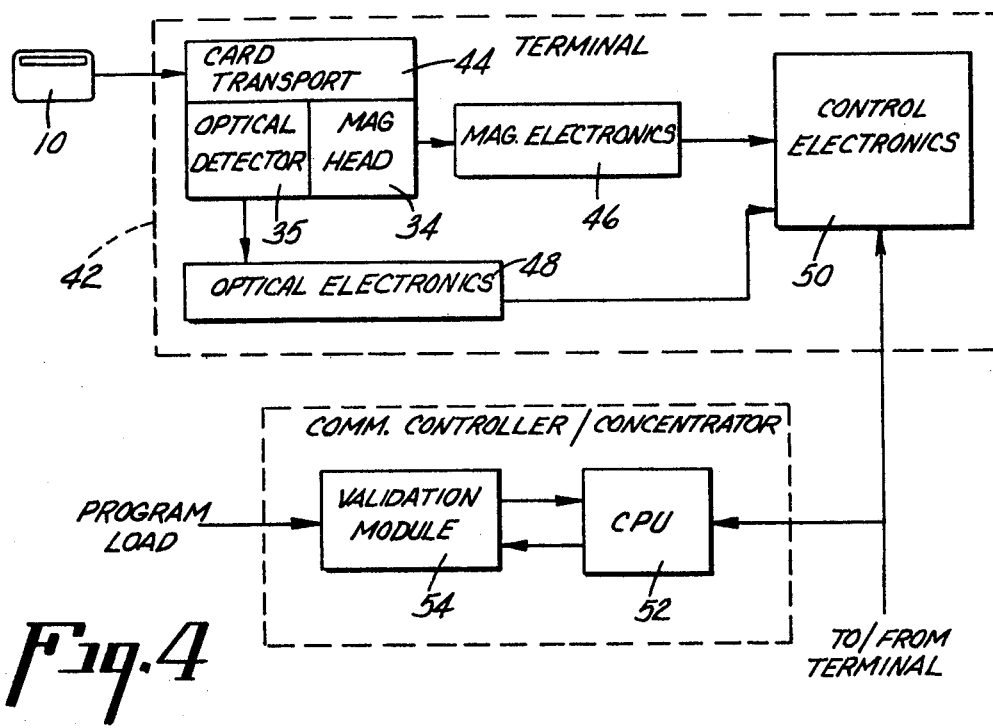
FIG. 4 is a simplified block diagram of a typical security system utilizing a credit card incorporating the secure property device of the present invention.

FIG. 4 is a block diagram of a typical security system utilizing the device of the present invention. Such a system is described in detail in the copending application of Francis C. Foote, Ser. No. 581,351 filed May 23, 1975 entitled SECURE PROPERTY DOCUMENT AND SYSTEM and assigned to the assignee of the present invention. Such a system includes a plurality of remote terminals. One such terminal is generally indicated by the numeral 42 and contains a card transport 44 in conjunction with the above-described magnetic read head 34 and optical detector 35. Signals from magnetic read head 34 are fed to appropriate circuitry 46, while the optical data signals are received by circuitry indicated by numeral 48. The magnetic and optical data signals are appropriately processed by circuits 46 and 48 before being fed to a communication control 50, which in turn sends the signals to a central processing unit (CPU) 52 and associated validation module 54.

The validation module is appropriately programmed to determine whether or not the presented document is authentic. This determination may be made in many different ways depending upon the nature of the system and the degree of security desired. One such arrangement entails reading of the optical and magnetic data from the card at the time of manufacture and storing such at the CPU/Validation Module in accordance with the card's account number or other appropriate identifier. The optical data may be encrypted with an encryption algorithm to further enhance the security of the system. When the card is subsequently presented to the system the optical and magnetic data read at the terminal is processed, encrypted if appropriate, and then compared with the data or code previously stored at the CPU. If the codes compare within predetermined limits acceptable to the system, an approval signal is sent back to the terminal to indicate that the card is authentic. On the other hand, if the generated code or data does not meet the system requirements, a corresponding signal is registered at the terminal, whereby the terminal operator may refuse to accept the card or require additional information before processing the transaction. It is not intended that the secure property device of the present invention be limited to use with the security system illustrated in FIG. 4, as many types of security systems may be provided by those skilled in the art to determine the authenticity of a credit card incorporating the device of the present invention.

In the preferred embodiment of the present invention, magnetic tape upon which has been deposited infrared reflectors and certain organic coatings or adhesives is deposited upon a credit card body by a hot stamping process. The magnetic tape must be such that the magnetic coating is substantially transparent to infrared radiation and opaque to visible radiation. It should also contain a release layer between the magnetic coating and the polyethylene terephthalate substrate in order to assist in good release properties during hot stamping. These and other requirements limit the selection of a magnetic tape. However, one tape which does seem to meet the requirements is a tape designated as 85-11A Release-tape manufactured by BASF Systems.

The invention will be better understood by reference to the following examples which are not intended to limit the present invention which is defined in the claims appended hereto.

EXAMPLE 1

A copolymer prepared by copolymerizing methyl methacrylate, butyl acrylate and butyl methacrylate, said polymer being dissolved in toluene and sold by Rohm and Haas as Acryloid B-48 N, and containing approximately 45% copolymer was further diluted with toluene according to the following formula:

| | |
|---|---|
| Toluene | 1,247.7 g. |

-continued

| Acryloid B-48 N | 271.1 g. |

The resulting clear solution was applied to 85-11A magnetic tape using a #3 wire coating rod. After evaporation of the toluene, the resulting film was tack-free and had a high specular gloss. Aluminum reflectors were deposited over this organic coating, the thickness of the aluminum being approximately 150 A. An adhesive was then applied and the tape was hot stamped onto a credit card body to fabricate a credit card with a security feature.

EXAMPLE 2

The procedure of Example 1 was followed, except that in place of the Acryloid B-48 N solution, an emulsion copolymer sold by Rohm and Haas as Rhoplex AC-61 was used. The continuous phase of the emulsion was water. The discontinuous phase comprised approximately 46% of non-volatile copolymers, prepared by copolymerizing methyl methacrylate and butyl acrylate. An acid type adhesion promoter was also present in the emulsion. The results obtained were similar to those obtained in Example 1.

Since the foregoing description and drawings are merely illustrative, the scope of protection of the invention has been more broadly stated in the following claims, and these should be liberally interpreted so as to obtain the benefit of all equivalence to which the invention is fairly entitled.

I claim:

1. A secure property device comprising a magnetic recording member and at least one radiant energy reflecting element, said element being secured to said magnetic recording member by means of a specularity enhancing adhesive composition comprised of a copolymer of monomers selected from the group consisting of lower alkyl acrylates and lower alkyl methacrylates.

2. A secure property device according to claim 1 wherein said magnetic recording member is in the form of a tape.

3. A secure property device according to claim 1 wherein said magnetic recording member is a magnetic recording tape.

4. A secure property device according to claim 1 wherein said radiant energy reflecting element is a vacuum deposited thin metallic film.

5. A secure property device according to claim 1 wherein said lower alkyl acrylate is butyl acrylate.

6. A secure property device according to claim 1 wherein said lower alkyl methacrylate is methyl methacrylate.

7. A secure property device according to claim 1 wherein said lower alkyl methacrylate is butyl methacrylate.

8. A secure property device according to claim 1 wherein said copolymer is a copolymer of butyl acrylate and methyl methacrylate.

9. A secure property device according to claim 1 wherein said copolymer is a copolymer of butyl acrylate, methyl methacrylate and butyl methacrylate.

10. A secure property document comprising a secure property device according to claim 1 adhered to a substrate therefor.

11. A secure property document according to claim 10 wherein said substrate is a card.

12. A secure property document according to claim 10 wherein said secure property device is adhered to said substrate by means of an adhesive.

13. A secure property document according to claim 12 wherein said adhesive comprises a copolymer of monomers selected from the group consisting of lower alkyl acrylates and lower alkyl methacrylates.

14. A secure property document according to claim 13 wherein said lower alkyl acrylate is butyl acrylate.

15. A secure property document according to claim 13 wherein said lower alkyl methacrylate is methyl methacrylate.

16. A secure property document according to claim 13 wherein said lower alkyl methacrylate is butyl methacrylate.

17. A secure property document according to claim 12 wherein said adhesive is a copolymer of butyl acrylate, methyl methacrylate and butyl methacrylate.

18. A secure property document according to claim 10 wherein said substrate comprises polyvinyl chloride.

19. A secure property document according to claim 10 wherein said substrate comprises a copolymer of vinyl chloride and vinyl acetate.

20. A secure property document according to claim 10 wherein said substrate comprises a thin polymeric laminant adhered to a core stock.

21. A secure property document according to claim 10 wherein said substrate comprises a core stock provided with an opaque coating.

22. A secure property document according to claim 10 wherein said radiant energy reflecting element is a vacuum deposited thin metallic film.

23. A process for producing a secure property device which comprises applying to a magnetic recording member a specularity enhancing adhesive copolymer of monomers selected from the group consisting of lower alkyl acrylates and lower alkyl methacrylates and depositing at least one radiant energy reflecting element thereon.

24. A process according to claim 23 wherein said copolymer is applied in the form of a solution in an organic solvent.

25. A process according to claim 24 wherein said organic solvent is toluene.

26. A process according to claim 23 wherein said copolymer is applied in the form of an aqueous dispersion.

27. A process according to claim 23 wherein said radiant energy reflecting element is deposited by vacuum deposition.

28. A process for producing a secure property document which comprises providing a secure property device by applying to a magnetic recording member a specularity enhancing adhesive copolymer of monomers selected from the group consisting of lower alkyl acrylates and lower alkyl methacrylates and depositing at least one radiant energy reflecting element thereon, and hot stamping said secure property device upon a substrate therefor.

29. A process according to claim 28 wherein said copolymer is applied in the form of a solution in an organic solvent.

30. A process according to claim 28 wherein said organic solvent is toluene.

31. A process according to claim 28 wherein said copolymer is applied in the form of an aqueous dispersion.

32. A process according to claim 28 wherein said radiant energy reflecting element is a thin metallic film.

33. A process according to claim 28 wherein said radiant energy reflecting element is deposited by vacuum deposition.

34. A process according to claim 28 wherein said substrate comprises polyvinyl chloride.

35. A process according to claim 28 wherein said substrate comprises a copolymer of vinyl chloride and vinyl acetate.

36. A process according to claim 28 wherein said substrate comprises a thin polymeric laminant adhered to a core stock.

37. A process according to claim 28 wherein said substrate comprises a core stock provided with an opaque coating.

38. A process according to claim 28 wherein an adhesive is applied to said secure property device prior to hot stamping upon said substrate.

* * * * *